No. 780,226.

Patented January 17, 1905.

UNITED STATES PATENT OFFICE.

LEONHARD PINK, OF BERLIN, GERMANY, ASSIGNOR TO MILTON OSCAR ALEXANDER, OF SAN FRANCISCO, CALIFORNIA.

CASTOR-OIL PRALINE.

SPECIFICATION forming part of Letters Patent No. 780,226, dated January 17, 1905.

Application filed February 9, 1903. Serial No. 142,635.

*To all whom it may concern:*

Be it known that I, LEONHARD PINK, a subject of the King of Prussia, Emperor of Germany, residing at Berlin, Germany, have invented certain new and useful Improvements in Castor-Oil Pralines, of which the following is a specification.

Castor-oil has always been known and used as an effective purgative; but on account of its objectionable taste and smell it is taken with aversion only.

Castor-oil is an organic salt the same as saltpeter is an organic salt. Acid and base are known to be ineffective each by itself, and the same, as is the case with most animal and vegetable fats, have the tendency to separate in the deposit, in which the base turns into glycerin. This even occurs in moist air, and free ricinolic acid therefore even often accompanies freshly-pressed oil. Besides sickness and other unpleasantness this acid may even produce constipation. It must be said, therefore, that castor-oil is used more than necessary in order to neutralize the noxious effects of the free acid. Besides, the oil has the tendency to dry in the air and to become rancid. From the surface this process affects the whole oil. Dry oil is also without effect.

The following process does away with all the inconveniences above mentioned: Castor-oil of best purchasable quality is heated one hour with carbonate of magnesia in small firm pieces, with an addition of urate of ammonia in the water-bath. Then the deacidified oil is filtered through a dry filter in the steam-bath and mixed to the consistency of a firm paste with powdered carbonate of magnesia, cocoa, essence of fruit, or vanillin, to which mixture about five per cent. of senna-leaves, powdered, may be added. This small quantity gives a pleasant bitter principle, as a surplus of cocoa freed from oil and fat makes the paste greasy. The firm paste cut into uniform pieces, which according to the temperature contains from seventy to eighty per cent. of chemically-pure oil, is dipped into a melted chocolate conversion, so that when cooled it is surrounded by a thick layer of chocolate.

Through my invention the access of water, even in the form of steam, is prevented. The surplus of carbonate of magnesia does not permit of a cleavage, because the least quantities of acid must form the magnesia salt. The chocolate cover prevents the access of air and the drying of the oil.

The durability of these pralines which contain such high percentage of the chemically-pure oil is unlimited, the effect is always certain, the dosing is exact and easy, and the taste and smell are pleasant.

Having thus described the invention, what is claimed as new, and desired to be secured by Letters Patent, is—

1. The herein-described process which consists in removing ricinolic acid from castor-oil by heating it with carbonate of magnesia and urate of ammonia, and filtering the resultant compound.

2. The herein-described process which consists in removing ricinolic acid from castor-oil by heating it with carbonate of magnesia and urate of ammonia, filtering the resultant compound, and causing the absorption of the filtered oil by a suitable vehicle.

3. The herein-described process which consists in removing ricinolic acid from castor-oil by heating it with carbonate of magnesia and urate of ammonia, filtering the resultant compound, and causing the absorption of the filtered oil by powdered magnesia.

4. The herein-described process which consists in removing ricinolic acid from castor-oil by heating it with carbonate of magnesia and urate of ammonia, and filtering the resultant compound through a dry filter in a steam-bath.

5. The herein-described process which consists in removing ricinolic acid from castor-oil by heating it with carbonate of magnesia and urate of ammonia, filtering the resultant compound through a dry filter in a steam-bath, and causing the absorption of the filtered oil by a suitable vehicle.

6. The herein-described process which consists in removing ricinolic acid from castor-oil by heating it with carbonate of magnesia and urate of ammonia, filtering the resultant compound through a dry filter in a steam-bath, and causing the absorption of the filtered oil by powdered magnesia.

7. A castor-oil praline having for its principal ingredients a predominating percentage of chemically-pure oil deacidified and filtered, sufficient magnesia and cocoa in powder to form a stiff mixture therewith, and a desirable flavoring and coating, the product being characterized by imperviousness to water, absence of cleavage, and non-drying of the oil therein contained.

In witness whereof I have hereunto signed my name, this 23d day of December, 1902, in the presence of two subscribing witnesses.

LEONHARD PINK.

Witnesses:
  HENRY HASPER,
  WOLDEMAR HAUPT.